April 5, 1938.    R. D. MacDONALD    2,112,918
DRIVING MECHANISM FOR ENSILAGE CUTTERS
Filed Nov. 2, 1936    2 Sheets-Sheet 1

Inventor
Raymore D. MacDonald
By V. F. Lavigne
Atty.

April 5, 1938.  R. D. MacDONALD  2,112,918
DRIVING MECHANISM FOR ENSILAGE CUTTERS
Filed Nov. 2, 1936  2 Sheets-Sheet 2
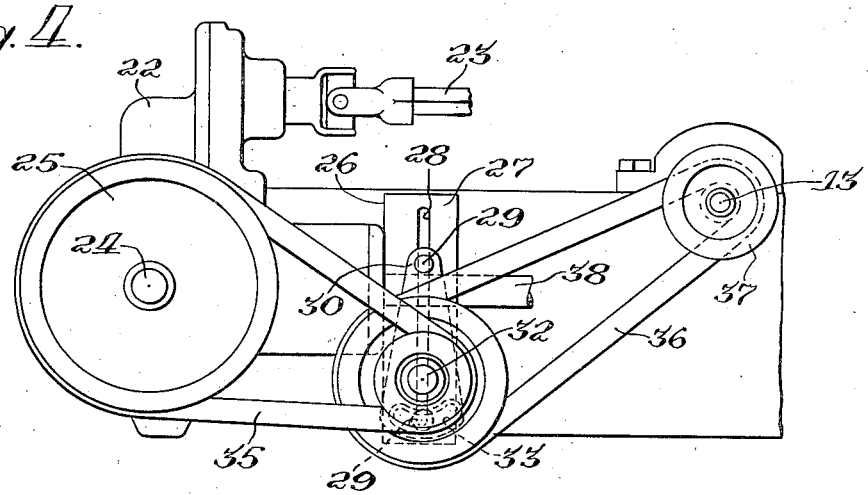
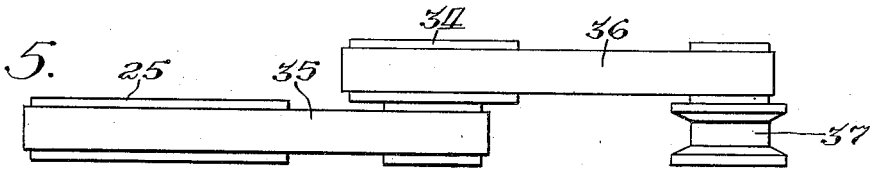
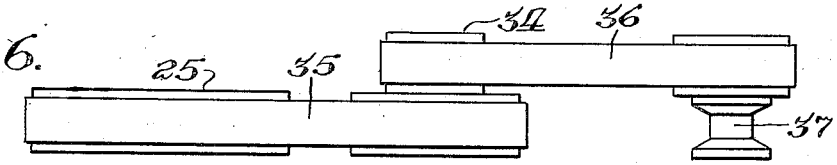
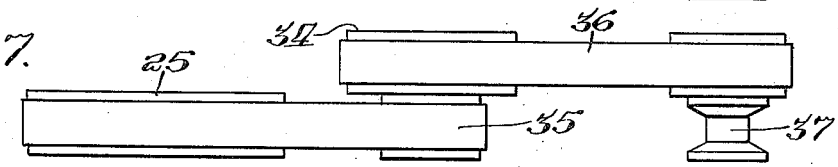
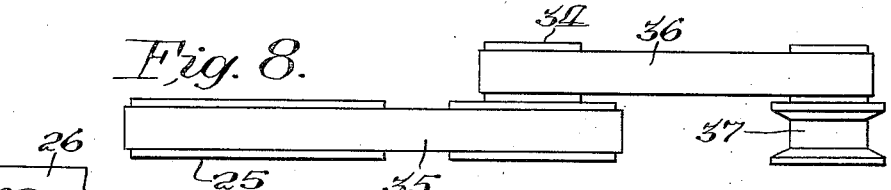
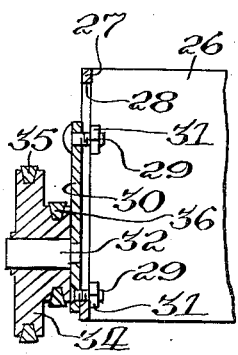
Inventor
Raymore D. MacDonald
By [signature]
Atty.

Patented Apr. 5, 1938

2,112,918

UNITED STATES PATENT OFFICE 2,112,918

DRIVING MECHANISM FOR ENSILAGE CUTTERS

Raymore D. MacDonald, Western Springs, Ill., assignor to International Harvester Company, a corporation of New Jersey Application November 2, 1936, Serial No. 108,718

7 Claims. (Cl. 146—109)

This invention relates to a driving mechanism for ensilage cutters, and particularly to a driving arrangement whereby the speeds of a feeding mechanism may be varied in a simple manner to regulate the lengths into which the stalks handled by the machine are to be cut.

Ensilage cutters usually comprise an upright cylindrical drum in which is located a rotor carrying both knives at equidistantly, angularly spaced intervals, and fan blades. The drum constitutes a cutting chamber and the knives on the rotor cooperate with a stationary shear-bar adjacent the feed opening for said chamber, so that the knives on the rotor cooperate with the shear-bar to cut the material, and the fan blades serve to blow the material upwardly out of the chamber by means of a blower pipe to a point of discharge. The material is fed into the chamber by means of a horizontal, endless conveyer into the side of the chamber and above the conveyer, at the feeder opening for the chamber, is usually disposed a corrugated feed regulating roller, which serves positively to move the stalks to be cut over the shear-bar. By regulating the speed at which this corrugated roller is driven, it is possible to vary the length of cut of the material handled by the ensilage cutter. This is so because the speed of rotation of the rotor carrying the equidistantly spaced knives is constant in relation to the shear-bar, and thus, by varying the speed of the feed, the lengths into which the stalks are to be cut can be varied.

More particularly the invention, therefore, relates to an improved and simplified driving means whereby the speed of rotation of the feed controlling roller may be varied to regulate the length of cut for the material to be handled by the ensilage cutter.

In the standard ensilage cutters, the usual arrangement was to provide a driven pulley shaft on which the cutting rotor was carried, and then, by means of a sprocket wheel and chain and through a counter-shaft, power was delivered to a large sprocket wheel that served to drive an enclosed gear mechanism, which, in turn, drove a shaft that was connected to drive the feed regulating roller. In such arrangement, however, if it was desired to change the speed of rotation of the feed regulating roller, various sizes of sprocket wheels had to be brought into play to change the speeds.

The present invention simplifies this driving arrangement by utilizing belts and grooved pulleys to make the drive relatively quiet and smooth, and also, by providing double pulleys, it is possible to increase the number of sizes to which the stalks may be cut, the structure also including means whereby the driving belts may be properly tensioned.

The main object of the invention is to provide an improved driving mechanism for the feed regulator of an ensilage cutter or the like.

Another object is to provide in such a driving mechanism means whereby the speed of rotation of the feed regulating roller may be regulated so that the material handled may be cut into the desired lengths.

Another object is to provide the relationship between component parts of the driving mechanism in a manner permitting quick, efficient changes between said parts to accomplish roller speed regulation.

Other important objects will be apparent to those skilled in this art as the disclosure is more fully made.

In the accompanying sheets of drawings, a practicable embodiment of the improved driving mechanism is illustrated, and in these drawings:

Figure 4 is another view similar to Figure 2, but showing a different speed ratio;

Figure 5 is a plan view of the belt and pulley arrangement as it is set when it is desired to cut the stalks in lengths of ⅜ of an inch, and corresponds with the showing in Figure 4;

Figure 6 is a similar view, showing the speed ratios of the driving arrangement when it is desired to cut the stalks in lengths of 1½ inches;

Figure 7 shows the pulley arrangement when it is desired to cut the stalks in lengths of ⅝ of an inch;

Figure 8 is a similar view, showing the driving arrangement when it is desired to cut the stalks to a length of ⅞ of an inch, the view corresponding with the showing in Figure 2; and, Figure 9 is a detail cross sectional view taken along the line 9—9 of Figure 2, looking in the direction of the arrows.

Figure 1:
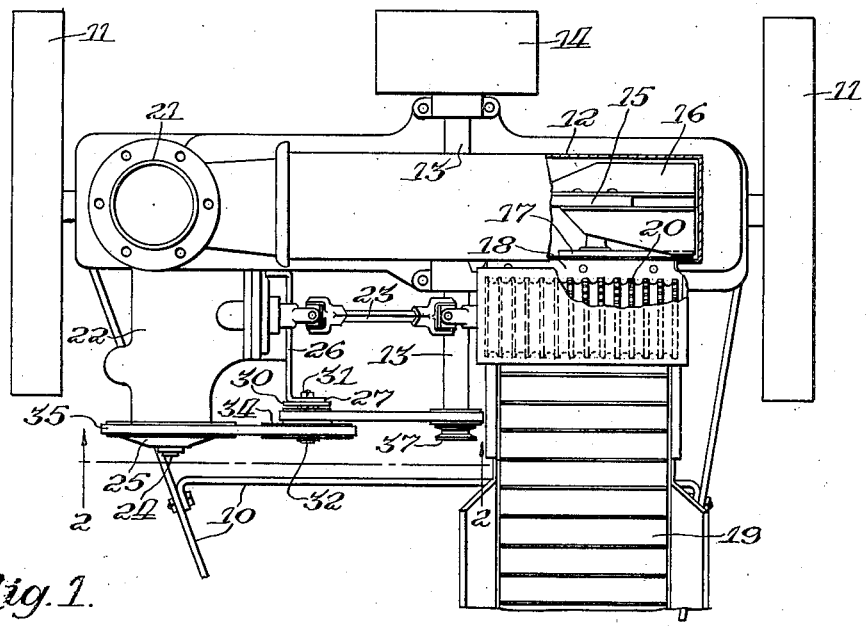
Figure 1 is a general plan view of a standard ensilage cutter modified to utilize the improved driving arrangement of this invention.
Figure 3:
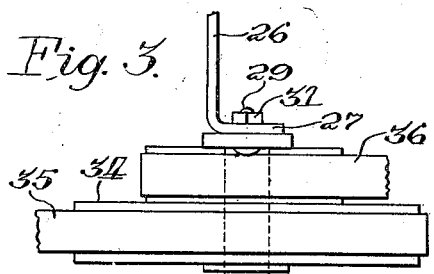
Figure 3 is a plan, detail view of the countershaft mounting utilized in this drawing arrangement, taken along the line 3—3 of Figure 2, looking in the direction of the arrows.

The ensilage cutter shown in Figure 1 comprises a main frame 10 carried on a wheel carriage 11, the frame 10 carrying an upright cylindrical drum 12, in which is carried a transverse main shaft 13 having a free or unsupported end portion and driven from a source of external power, as by means of a pulley 14. The shaft 13, inside the drum 12, carries a rotor 15 including the usual fan blade 16 and equidistantly, angularly spaced knives 17, which cooperate with a stationary shear-bar 18 disposed in a side feed opening formed in the usual manner in the drum 12.

The feeder conveyer 19 is provided in the usual manner whereby stalks to be cut may be fed into a feed opening in one face of the drum 12 across the shear-bar 18, so that the infeeding material may be cut by the knives 17 as the rotor 15 turns. Disposed above the feed conveyer 19 adjacent the shear-bar 18 is the usual corrugated feed roller 20, which is mounted for rotation and serves to regulate the speed at which the material on the conveyer 19 is fed over the shear-bar 18 into the drum or chamber 12.

The drum 12 at one end includes the usual upstanding pipe 21, through which the cut material is discharged pneumatically by the fan blades 16 carried by the rotor 15, in a manner well understood in this art. Adjacent the discharge pipe 21, the frame 10 carries an enclosed gear box 22, from which protrudes a shaft 23 to drive the feed regulating roller 20. The gear box 22 also carries a transmission shaft 24 having a free or unsupported end portion, on which is carried a large V-groove pulley 25. The gear box 22, as shown in Figures 1 and 2, carries a frame bar 26 having a right angularly bent end 27, which, as shown in Figures 2 and 9, provides a vertical wall having formed therein an elongated, vertical slot 28, in which is carried an upper and lower bolt 29, whereby a bracket 30 may be secured by means of nuts 31 to the extension 27 in various up and down positions of adjustment.

Figure 2:
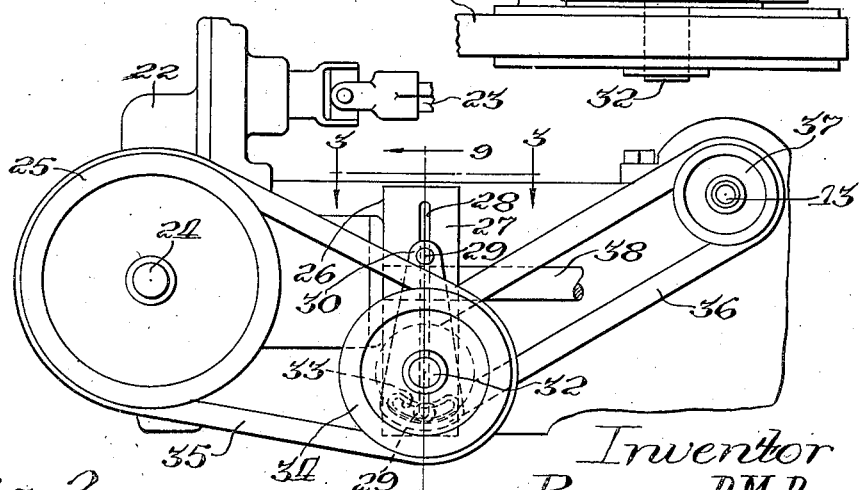
Figure 2 is an elevational view of the driving arrangement of this invention taken along the line 2—2 of Figure 1, looking in the direction of the arrows.

This plate 30 has secured thereto a stub counter-shaft 32, and furthermore, below this counter-shaft 32, the plate 30 is formed with an arcuate slot 33, as shown in Figure 2, so that the lower bolt 29, shown in Figure 9, passes through the arcuate slot 33 as well as through the slot 28 in the extension 27 of the frame bar 26. It follows, from this slot and bolt construction, that the bracket 30 may be raised and lowered in the slot 28 relative to the extension 27, and further said plate 30 may be swung to the right or left, as shown in Figure 2, by virtue of the provision of the lower arcuate slot 33, the swinging movement of the bracket 30 taking place about the axis of the upper bolt 29 in a manner that will readily be understood.

The idler shaft 32 on the plate or bracket 30 has a free or unsupported end portion and is provided to carry a double V-groove pulley 34, said pulley 34 embodying a large pulley and a relatively small pulley, with the double pulley capable of mounting on the shaft 32 from either side; that is, it may be reversed, with either pulley portion on the inside or the outside, as desired. A belt 35 connects one of the pulleys 34 with the large pulley 25. The other pulley portion of the double pulley 34 will be connected by a belt 36 with a double pulley member 37 mounted on the main drive shaft 13. The double pulley 37 also embodies a large pulley portion and a relatively smaller pulley portion, and the same can be reversibly mounted on the shaft 13.

A shaft 38 extends out of the gear box 22 in the usual manner to drive the conveyer belt 19. This completes the detailed description of the parts, and the manner of use of the improved driving arrangement for the feed regulating roller 20 will now be summarized.

If it is desired to drive the feed regulating drum 20 at a peripheral speed, so that the stalks handled thereby will be fed at such a rate of speed in relation to the knives 17 as to cut the stalks in lengths of ⅜ of an inch, then the pulley arrangement will be in accordance with the showing in Figures 4 and 5, where it will be seen that the small pulley portion of the drive pulley 37 is connected by the belt 36 to the large pulley portion on the double pulley 34, and the small pulley portion of the pulley 34 is connected by the belt 35 to the large single pulley 25. By this speed ratio, the gearing in the gear box 22 is driven at a relatively slow speed, so that the shaft 23 will be driven slowly and, in turn, the feed regulating drum 20 will be driven slowly. Consequently the stalks moved over the shear-bar 18 will move so slowly that the constantly moving knives 17 will cut the stalks in lengths of ⅜ of an inch.

In Figure 6, the ratio between the pulleys has been altered so that the feed regulating drum 20 will turn four times as fast and cause the stalks to be cut in lengths of substantially 1½ inches. This ratio is achieved by reversing the pulley 37 on the shaft 13, so that belt 36 connects the large portion of the pulley 37 with the small portion of the pulley 34, which latter also has been reversed in its position on the idler shaft 32. Also, the belt 35 drives the constant sized pulley 25 from the large pulley portion of the pulley 34. The ratio now is such that the stalks are fed to the cutter four times as fast as in the condition of the drive parts shown in Figure 5.

If it is desired to rotate the drum 20 slightly slower than described above, so that the stalks will be cut into lengths of substantially ⅞ of an inch, then the pulley 37 remains on the main drive shaft 13 in the same position that it occupied in Figure 5, but the pulley 34 is reversed on the shaft 32 in such a manner that the belt 36 drives the small pulley portion of the pulley 34 from the small pulley portion of the pulley 37, as shown in Figure 8.

If it is desired to regulate the speed of the drum 20, so that the stalks will be fed at a rate permitting them to be cut into lengths of ⅝ of an inch, then the pulleys are arranged as shown in Figure 7, where the large portion of the pulley 37 is connected by the drive belt 36 to the large portion of the pulley 34 and the small portion of the pulley 34 is connected by the belt 35 to the pulley 25.

From this description it will be seen that in a simple manner the speed ratios for the transmission that drives the feed regulating roller may be easily changed as desired to regulate the length of cut and that the parts are always available in place ready for use. The taking off and placing on of the V-belts 35 and 36 is simplified by the fact that the plate 30, which carries the idler pulley 34, may be raised or lowered, or swung from side to side. This same adjusting means makes it possible properly to tension the belts and, by means of the nuts 31, the idler double pulley 34 may be locked in the desired position of adjustment. It will be noted also that the free or unsupported end portions of the shafts 32 and 13 render the removal and reversal of the pulleys 34 and 37 a simple, efficient procedure. From this it will be seen that an improved driving means for ensilage cutter feed regulating rollers has been provided, which achieves the desirable objects heretofore recited for the invention.

It is the intention to cover all changes and modifications of the example herein shown and described which do not depart from the spirit and scope of the invention which is defined in the following claims.

What is claimed is:

1. In an ensilage cutter having a frame, a main shaft thereon carrying a rotary cutter and having a free end projecting from the frame, feeding means including a rotary roller for regulating the feed of material to the cutter, transmission means to drive said roller, the combination with said roller of means to drive same through the transmission means at different speeds to regulate the lengths into which the material is to be cut, said means comprising a shaft included in and having a free end projecting from the transmission means, a drive wheel on the free end of said shaft, a stub shaft carried on the frame parallel to and intermediate the transmission shaft and main shaft and having a free end projecting from the frame, a drive wheel on the free end of the main shaft having two different sized drive portions, a wheel on the free end of the stub shaft having two different sized drive portions, a drive belt connecting the drive wheel on the transmission shaft with one of the drive portions of the wheel on the stub shaft, and a drive belt connecting the other drive portion of the stub shaft wheel with one of the drive portions of the drive wheel on the main shaft, said drive belts being positionable on respective different sized portions of the wheels to vary the speed of the transmission shaft.

2. In an ensilage cutter having a frame, a main shaft thereon carrying a rotary cutter and having a free end projecting from the frame, feeding means including a rotary roller for regulating the feed of material to the cutter, transmission means to drive said roller, the combination with said roller of means to drive same through the transmission means at different speeds to regulate the lengths into which the material is to be cut, said means comprising a shaft included in and having a free end projecting from the transmission means, a pulley wheel on the free end of said shaft, a stub shaft carried on the frame parallel to and intermediate the transmission and main shaft and having a free end projecting from the frame, a reversible pulley wheel on the free end of the main shaft having two different sized drive portions, a reversible pulley wheel on the free end of the stub shaft having two different sized drive portions, a drive belt connecting the pulley wheel on the transmission shaft with one of the drive portions of the stub shaft pulley, and a drive belt connecting the other drive portion of the stub shaft pulley wheel with one of the drive portions of the pulley wheel on the main shaft, said pulleys being removable and reversible on the free ends of the shafts without interfering with the frame, said drive belts being positionable on respective different sized portions of the pulleys in either of the reversible positions of said pulleys to vary the speed of the transmission shaft.

3. In an ensilage cutter having a frame, a main shaft thereon carrying a rotary cutter and having a free end projecting from the frame, feeding means including a rotary roller for regulating the feed of material to the cutter, transmission means to drive said roller, the combination with said roller of means to drive same through the transmission means at different speeds to regulate the lengths into which the material is to be cut, said means comprising a shaft included in and projecting from the transmission means, a drive wheel on the free end of said shaft, an adjustable idler shaft carried on and having a free end projecting from the frame intermediate the transmission shaft and main shaft and parallel therewith, a drive wheel on the free end of the main shaft having two different sized drive portions, an idler wheel on the free end of the idler shaft having two different sized drive portions, a drive belt connecting the drive wheel on the transmission shaft with one of the drive portions of the idler wheel, and a drive belt connecting the other drive portion of the idler wheel with one of the drive portions of the drive wheel on the main shaft, said drive belts being positionable on respective different sized portions of the wheels for varying the speed of the transmission shaft, said idler wheel being adjustable between the main and transmission shafts to tighten both drive belts simultaneously.

4. In an ensilage cutter having a frame, a main shaft thereon carrying a rotary cutter and having an unsupported end portion projecting from the frame, feeding means including a rotary roller for regulating the feed of material to the cutter, transmission means to drive said roller, the combination with said roller of means to drive same through the transmission means at different speeds to regulate the lengths into which the material is to be cut, said means comprising a shaft included in and having an unsupported end portion projecting from the transmission means and carrying a drive wheel at said end portion, an idler shaft carried on and having an unsupported end portion projecting from the frame intermediate the transmission shaft and main shaft and parallel therewith, a pulley wheel on the end portion of the main shaft having two different sized drive portions, a pulley wheel on the end portion of the idler shaft having two different sized drive portions, a drive belt connecting the drive wheel on the transmission shaft with one of the drive portions of the idler wheel, a drive belt connecting the other drive portion of the idler wheel with one of the drive portions of the drive wheel on the main shaft, and means carried by the frame for adjusting the idler wheel to tension either of the belts independently of the other.

5. In an ensilage cutter having a frame, a main shaft thereon carrying a rotary cutter, feeding means including a rotary roller for regulating the feed of material to the cutter, transmission means to drive said roller, the combination with said roller of means to drive same through the transmission means at different speeds to regulate the lengths into which the material is to be cut, said means comprising a shaft included in the transmission means and carrying a drive wheel, an idler shaft carried on the frame intermediate the transmission shaft and main shaft, a drive wheel on the main shaft having two different sized drive portions, an idler wheel on the idler shaft having two different sized drive portions, a drive belt connecting the drive wheel on the transmission shaft with one of the drive portions of the idler wheel, a drive belt connecting the other drive portion of the idler wheel with one of the drive portions of the drive wheel on the main shaft, and means on the frame carrying the idler wheel for translational and swinging movements relative to the frame including fastening means for adjustably fixing the idler wheel in different positions of adjustment.

6. In an ensilage cutter having a frame, an outwardly extending main shaft thereon carrying a rotary cutter, a feeding means including a rotary roller for regulating the feed of material to the cutter, transmission means to drive said roller, the combination with said roller of means to drive same through the transmission means at different speeds to regulate the lengths into which the material is to be cut, said means comprising an outwardly extending shaft included in the transmission means and carrying a drive wheel, an outwardly extending stub shaft carried on the frame intermediate the transmission shaft and main shaft, a drive wheel on the main shaft having different sized drive portions, a wheel on the stub shaft having different sized drive portions, a drive belt connecting the drive wheel on the transmission shaft with one of the drive portions of the wheel on the stub shaft, and a drive belt connecting another drive portion of the wheel on the stub shaft with one of the drive portions of the drive wheel on the main shaft, said three shafts being parallel and the drive wheels thereon being in alignment substantially outside of the major portion of the frame.

7. In an ensilage cutter having a frame, an outwardly extending main shaft thereon carrying a rotary cutter, feeding means including a rotary roller for regulating the feed of material to the cutter, transmission means to drive said roller, the combination with said roller of means to drive same through the transmission means at different speeds to regulate the lengths into which the material is to be cut, said means comprising an outwardly extending shaft included in the transmission means and carrying a pulley wheel, an outwardly extending, adjustable stub shaft carried on the frame intermediate the transmission and main shafts, a pulley wheel on the main shaft having different sized drive portions, a pulley wheel on the stub shaft having different sized drive portions in alignment with related drive portions on the aforesaid pulley, a drive belt connecting the drive wheel on the transmission shaft with one of the drive portions of the wheel on the stub shaft, a drive belt connecting another drive portion of the wheel on the stub shaft with one of the drive portions of the drive wheel on the main shaft, said three shafts being parallel and the pulleys thereon being in the same plane outside the major portion of the frame, and means for changing the position of the stub shaft and its pulley wheel in relation to the other two shafts to change the relative spacing between the shafts, each of said pulleys being positionable on its respective shaft whereby related drive portions on the pulleys may be aligned to receive the belts in different positions for regulating the speed of the transmission shaft.

RAYMORE D. MacDONALD.